(12) United States Patent  
Bieber et al.

(10) Patent No.: US 7,876,307 B2  
(45) Date of Patent: Jan. 25, 2011

(54) MOTION DETECTION MECHANISM FOR LASER ILLUMINATED OPTICAL MOUSE SENSOR

(75) Inventors: Lawrence Bieber, Colorado Springs, CO (US); Michel Willemin, Prêles (CH)

(73) Assignee: EM Microelectronic-Marin SA, Marin (CH)

( * ) Notice: Subject to any disclaimer, the term of this patent is extended or adjusted under 35 U.S.C. 154(b) by 1013 days.

(21) Appl. No.: 11/165,537

(22) Filed: Jun. 24, 2005

(65) Prior Publication Data

US 2006/0226346 A1    Oct. 12, 2006

(30) Foreign Application Priority Data

Apr. 11, 2005 (EP) .................................. 05102845

(51) Int. Cl.
*G09G 5/08* (2006.01)
(52) U.S. Cl. ........................ 345/166; 345/158
(58) Field of Classification Search ................. 345/156, 345/166, 158
See application file for complete search history.

(56) References Cited

U.S. PATENT DOCUMENTS 4,631,400 A * 12/1986 Tanner et al. ............... 250/221
4,794,384 A * 12/1988 Jackson ...................... 345/166
5,793,357 A    8/1998 Ivey et al.
2002/0105656 A1* 8/2002 Nahum et al. ............... 356/614
2005/0062720 A1* 3/2005 Rotzoll et al. ............... 345/166

FOREIGN PATENT DOCUMENTS

WO    WO 03 049018 A1    6/2003
WO    WO 03/049018 A1    6/2003

* cited by examiner

*Primary Examiner*—Chanh Nguyen
*Assistant Examiner*—Ram A Mistry
(74) *Attorney, Agent, or Firm*—Sughrue Mion, PLLC

(57) ABSTRACT

There is described a method for measuring relative motion between an illuminated portion of a surface and an optical sensing device comprising a coherent light source and a photodetector array, the method comprising the steps of illuminating under a determined gradient by means of the coherent light source the surface portion at a determined flash rate; detecting by means of the photodetector array speckled light intensity pattern of the illuminated portion of the surface for a first flash; detecting a second speckled light intensity pattern of the illuminated portion of the surface for a second flash; extracting motion features of two different types from the detected first and second speckled light intensity patterns; determining a measurement of the relative motion between the optical sensing device and the illuminated surface portion based on a comparison of motion features extracted; wherein before the step of determining a measurement of the relative motion, the method further comprises the step of keeping only pairs of neighbouring motion features including one motion feature of both different types.

17 Claims, 3 Drawing Sheets

MOTION DETECTION MECHANISM FOR LASER ILLUMINATED OPTICAL MOUSE SENSOR

This application claims priority from European Patent Application No. 05102845.4 filed Apr. 11, 2005, the entire disclosure of which is incorporated herein by reference.

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of pointing devices which comprise an optical sensing device including a photodetector array for measuring the varying intensity pattern of a portion of a surface which is illuminated with radiation and for extracting information about the relative motion between the photodetector array and the illuminated portion of the surface.

BACKGROUND OF THE INVENTION

Such an optical pointing device is already known in the art. International Patent Application No WO 03/049018, filed in the name of the same Assignee, which is incorporated herein by reference, discloses a method as well as a device for motion detection in an optical sensing device, such as an optical mouse.

Nevertheless optical pointing devices using a Light Emitting Diode (LED) as illumination source does not present the expected tracking performances for all kinds of surfaces, in particular on wood or glass. As an alternative to a LED, some recent pointing devices utilize a laser illumination source as a solution to the surface coverage reduction problem. However, the image that results from laser illumination is dominated by interference patterns commonly referred to as speckle. Among the factors that contribute to the speckle pattern are the type of the illumination source, system optics and the surface topography.

The image formed by laser illumination has a high spatial frequency content that prevents motion detection methods of the prior art, in particular the "Peak/Null Motion Detection" algorithm disclosed in WO 03/049018, from working efficiently for all kind of surfaces. Indeed with a laser illumination source, the number of motion features seen by the photodetector device is very high. This unusually high number of detected motion features has a negative impact on the way the photodetector will detect "loss of tracking" condition, which can be detected by looking at the number of motion features of the current flash that appear to come from nowhere from the previous flash, defined as "ghost motion features". The failure to properly detect a "loss of tracking" condition results in poor performance during some motion conditions, such as high acceleration. When the photodetector experiences high rates of acceleration, it has to dynamically adjust the flash rate of the illumination source so that it may still track and determine the correct motion. The incorrect detection of "loss of tracking" causes deficiencies to appear in motion detection.

SUMMARY OF THE INVENTION

The object of the present invention is thus to overcome drawbacks of the aforementioned prior art by providing a more reliable detection motion calculation method and an optical sensing device thereof.

According to a first aspect of the invention, it concerns a method for measuring relative motion between an illuminated portion of a surface and an optical sensing device comprising a coherent light source and a photodetector array, the method comprising the steps of:

illuminating under a determined gradient by means of the coherent light source said surface portion at a determined flash rate;

detecting by means of the photodetector array speckled light intensity pattern of the illuminated portion of the surface for a first flash;

detecting a second speckled light intensity pattern of the illuminated portion of the surface for a second flash;

extracting motion features of two different types from the detected first and second speckled light intensity patterns;

determining a measurement of the relative motion between the optical sensing device and the illuminated portion of the surface based on a comparison of motion features extracted;

wherein before the step of determining a measurement of the relative motion, the method further comprises the step of:

keeping only pairs of neighbouring motion features including one motion feature of both different types.

According to a preferred variant of this method, it may comprise a preliminary step consisting in modifying/adjusting the gradient under which the surface portion is illuminated. Other advantageous variant of the method are defined in the dependent claims.

According to another aspect of the present invention, it also concerns an optical motion sensing device comprising:

a coherent light source for illuminating under a determined gradient a surface portion with radiation at a determined flash rate;

a photodetector device responsive to radiation reflected from the illuminated surface portion which determines a speckled light intensity pattern for each flash;

means for extracting motion features of two different types from the speckled light intensity patterns;

processing means for determining, based on the extracted motion features, a measurement of relative motion between the sensing device and the illuminated portion of the surface;

wherein the processing means further comprise selecting means for keeping only pairs of neighbouring motion features including one motion feature of both different types.

According to a preferred embodiment, the optical motion device further comprises filtering means for modifying/adjusting the gradient. Other advantageous embodiments are defined in the dependent claims.

FIGURES

DETAILED DESCRIPTION OF THE INVENTION

Figure 1:
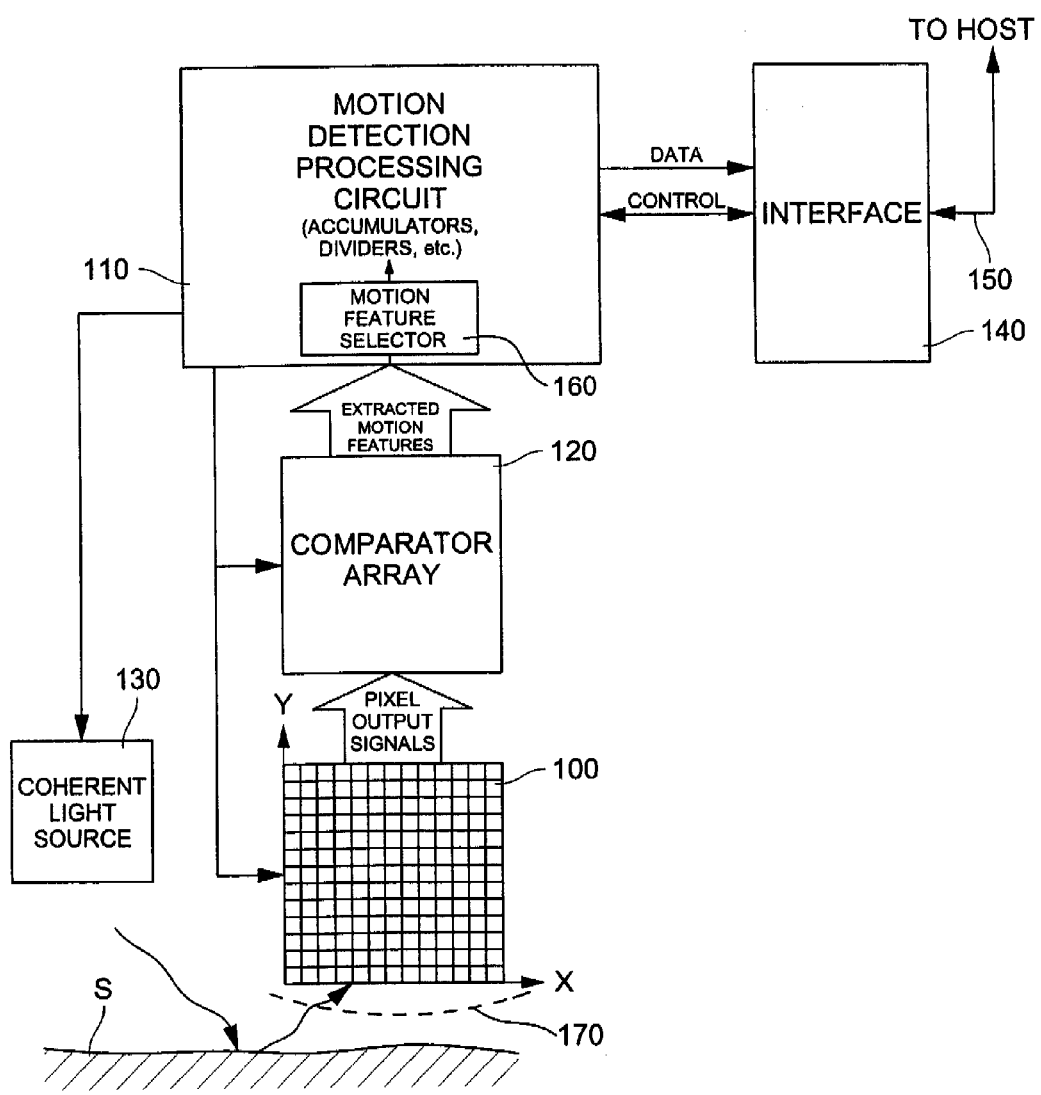
FIG. 1 is a schematic block diagram of an optical pointing device.

In the following description, the motion detection method will be described in an illustrative and non-limiting manner in relation with an optical pointing device as illustrated in FIG. 1. However, it will be appreciated that any other suitable optical pointing device may be used in order to implement the method according to the invention.

FIG. 1 is a generalized schematic block diagram of an optical pointing device. It comprises a photodetector array 100 including a plurality of pixels, this photodetector array 100 being coupled to processing means 110 (or motion detection processing circuit) for processing the signals outputted by the photodetector array 100.

A comparator array 120 may be interposed between processing means 110 and array 100, this comparator array 120 including a plurality of comparator circuits each for comparing the light intensity of a first pixel of array 100 with the light intensity of a second pixel of array 100 and for outputting resulting motion feature conditions.

The optical pointing device further comprises at least one coherent light source 130 such as a laser illumination source, which produces radiation at a determined flash rate, that impinges with a determined gradient on a portion of a surface S. Surface S may be a planar or non-planar surface, such as a surface over which the pointing device is moved (as in the case of an optical mouse), the surface of a ball (as in the case of an optical trackball) or any other suitable surface that may provide an appropriate speckled intensity pattern for detection by photodetector array 100.

Processing means 110 is further adapted to communicate in a bi-directional manner with an interface 140 that communicates in turn with a host system (not illustrated) over a bus 150. Cursor control signals (and eventually other signals related to the optical pointing device) are supplied to the host system over bus 150. Processing means 110 may also receive information, such as configuration signals, over bus 150 from the host system.

Processing means 110 is essentially designed to intermittently sample the pixel outputs of photodetector array 100 in accordance with a defined sequence. The information of two successive samples or speckled images is compared and a relative motion measurement is extracted by processing means 110. The adequate cursor control signals are then derived from the relative motion measurement and transmitted to the host system via line interface 140.

Figure 3:
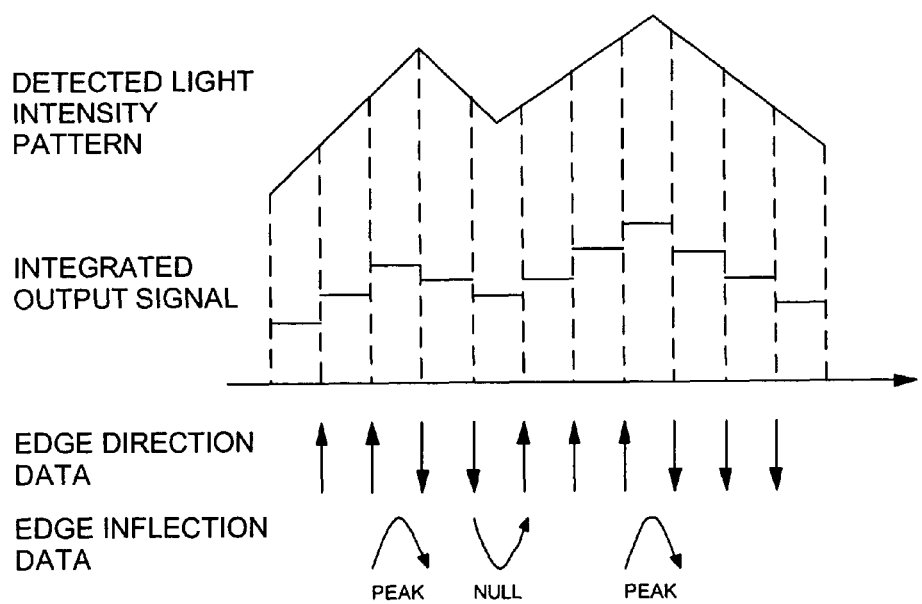
FIG. 3 is a schematic illustration of edge inflection conditions, or peaks and nulls, derived from a sequence of edge direction conditions along a determined axis of the photodetector device.

However, as it has been already mentioned in the introduction of the specification, the light intensity pattern detected by photodetector device 100 forms a speckled image as represented on FIG. 3 which presents too many motion features which render motion detection less reliable. Since the large number of detected motion features, due to the coherent light source, may be viewed as excess and unnecessary information that has a negative impact on the tracking performance of the photodetector, a method is proposed that utilizes certain motion features and ignores those motion features that are not required for accurate motion detection. For that purpose according to an embodiment of the present invention, processing means 110 are provided with a motion feature selector 160 for keeping only some of the extracted motion features which are more representative of the motion. A specific example of selection means will be given below in relation with FIGS. 4a and 4b. Thus, with less motion features considered, the "loss of tracking" information may be triggered with greater accuracy and the flash rate adjusted suitably.

In order to further reduce the number of considered motion features when determining a measurement of the relative motion, it has been shown within the scope of the present invention, that the laser illumination has a fairly steep Gaussian gradient which presents a high spatial frequency. Therefore according to an advantageous embodiment, the optical sensing is provided with filtering means for either modifying or adjusting the gradient in order to enhance the tracking performances by filtering out the weak information, i.e. the tiny speckles responsible for lowering the signal-over-noise ratio. According to the fact that the extracted motion features exist only in the presence of a gradient, the variation of this gradient or a simulation equivalent to a gradient variation will act as a filter of these features. In the case of a large gradient for instance, a weak motion feature will vanish.

According to a first preferred embodiment, the filtering means are carried out in the form of an offset which is introduced at the input of comparator array 120. Comparator array 120 comprises several comparators used to compare light intensity between neighbouring pixels of the photodetector device 100. Each comparator has at least two inputs which each receive light intensity data from one pixel or group of pixels. Introduction of an offset at one input of each comparator has the same effect as an illumination gradient. Advantageously, one may introduce an adjustable offset in the comparison of pixel-output levels. Indeed, an offset in the pixel comparators can be electrically continuously well controlled. Further, different filtering can be applied independently to the two X and Y axes. According to a preferred variant of this first embodiment, it is provided with a feedback loop acting on the comparator offset for adjusting the density of motion features for optimal tracking performances.

According to a second embodiment, the filtering means are carried out by the means of an optical gradient. One variant of this second embodiment consists in adjusting the position of the coherent light source in order to modify the illumination gradient. Another variant of this second embodiment consists in moving an optical lens 170 which focuses the reflected radiation from the surface portion on the photodetector device. Both previous variants may be combined.

According to a third embodiment, the filtering means are carried out in the form of an, preferably adjustable, intensity threshold under which no motion features is extracted. As well as for the first embodiment, a feedback loop acting on the comparator offset for adjusting the density of motion features for optimal tracking performances may be provided. A variant of this third embodiment consists in defining at least two intensity thresholds under which no motion features is extracted and then providing with selecting means for selecting one of the at least two intensity thresholds for enhancing tracking performances.

Figure 2:
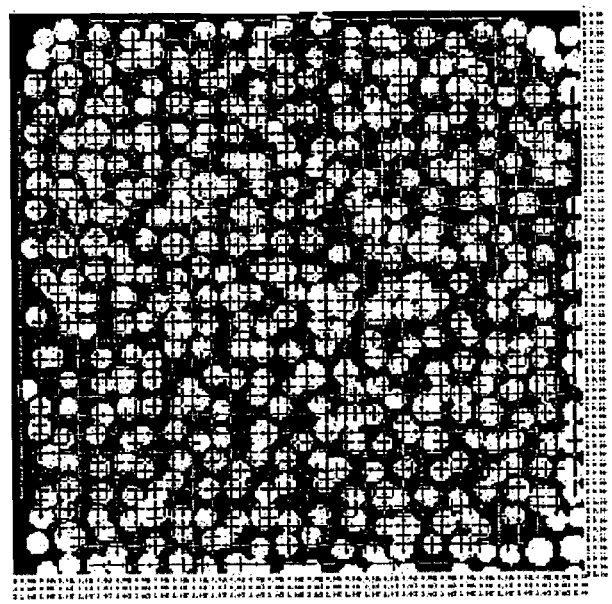
FIG. 2 is an image of a detected speckled light intensity pattern when using a coherent light source.

FIG. 2 is an image of a detected speckled light intensity pattern when using a coherent light source. All white speckles have different intensity levels representative of the level of illumination. However with a coherent light source, the speckled image, which is a function of interference caused by the surface, has rather large amplitude variations of much higher spatial frequency. The typical speckle size is mainly driven by the optics. With realistic numerical apertures, this typical feature size may be relatively small compared to the pixel pitch. Consequently, a speckle image leads to a high density of motion features. In such a case, the ghost motion feature count becomes irrelevant for detecting a "loss of tracking" condition because this count remains at an artificially low level or even zero due to the high feature density. Some of these features may be qualified as weak features if they result from tiny speckles. Therefore it is proposed to filter out the weak information coming from tiny speckles responsible for lowering the signal-over-noise ratio and degrading motion detection reliability. For that reason filtering means is advantageously provided for limiting the number of motion features extracted from this light intensity patterns.

The method for motion detection disclosed in this document is based on the "Peak/Null Motion Detection" algorithm fully described in the International Patent Application WO 03/049018 which algorithm is enclosed herewith by way of reference.

This "Peak/Null Motion Detection" algorithm is based on so-called edge direction data. As represented on FIG. 3, a distinction is made between edges according to their "direction". In particular, one defines two distinct edge direction conditions: (i) a first edge condition, or positive edge represented by upward arrows, defined as a condition wherein the light intensity of a first pixel is less than the light intensity of a second pixel; and (ii) a second edge condition, or negative edge represented by downward arrows, defined as a condition wherein the light intensity of the first pixel is greater than the light intensity of the second pixel. This edge direction conditions are determined for both axes X and Y.

Each row and column of the photodetector array is further analysed to find specific inflection conditions (hereinafter defined as a first inflection condition, or "peak", and a second inflection condition, or "null") in the direction of successive edges along a selected axis (in practice along both X and Y axes). As illustrated in FIG. 3, the first inflection condition, or peak, is defined as the succession, along a determined axis (X or Y), of a positive edge (arrow pointing upwards in FIG. 3) followed by a negative edge (arrow pointing downwards in FIG. 3). Similarly, the second inflection condition, or null, is defined as the succession, along the determined axis, of a negative edge followed by a positive edge.

Figure 4A:
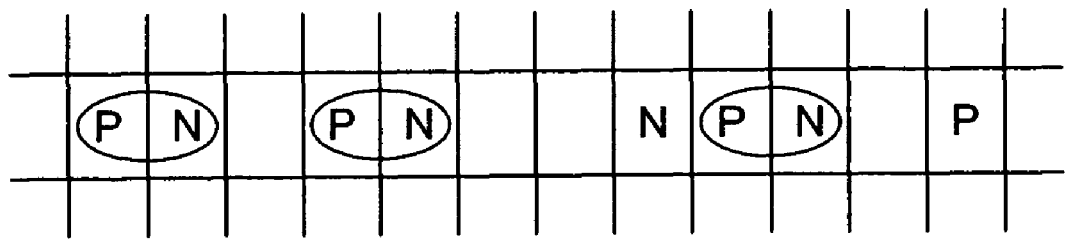
FIGS. 4a and 4b are schematic illustrations of extracted motion features from speckled light intensity patterns obtained with a coherent light source.
Figure 4B:
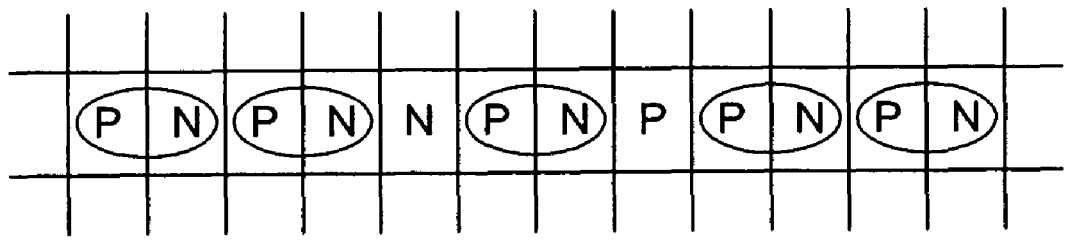

FIGS. 4a and 4b are schematic illustrations of extracted motion features, comprising peaks and nulls as defined in the "Peak/Null Motion Detection" algorithm from speckled light intensity patterns (FIG. 2) obtained with a coherent light source. When considering the "Peak/Null Motion Detection" algorithm, the superposition of gradient and speckle results in inflection conditions that tend to occur in peak and null pairs. The direction of the gradient determines whether the pair occurs as peak/null or null/peak inflections. The proposed motion detection method according to the invention consists in the following steps:

illuminating under a determined gradient by means of the coherent light source the surface portion at a determined flash rate;

detecting by means of said photodetector array speckled light intensity pattern of said illuminated portion of the surface for a first flash;

detecting a second speckled light intensity pattern of the illuminated surface portion for a second flash;

extracting motion features of two different types, for instance peaks and nulls, from the detected first and second speckled light intensity patterns;

keeping only pairs of neighbouring motion features including one motion feature of both different types, for instance peak/null or null/peak inflections according to the direction of the gradient.

determining a measurement of the relative motion between the optical sensing device and the illuminated surface portion based on a comparison of remaining motion features.

Referring now to FIG. 4a, motion feature selector 160 of FIG. 1 is implemented by selecting only pairs of peak/null inflections which are encircled and ignoring individually occurring peaks and nulls.

Referring now to FIG. 4b represents some extreme cases where inflection conditions appear everywhere, i.e. one each pixel of the photodetector array, it is preferably provided with filtering means as detailed above. In such extreme cases, the motion detection method preferably further comprises the step of modifying or adjusting the gradient under which the surface portion is illuminated.

According to a first variant of this preferred method, the motion feature extracting step consists in comparing light intensity with an offset between neighbouring pixels from first and second speckled light intensity patterns and extracting motion features as a result of the comparison. Advantageously, the introduced offset is adjustable.

According to a second variant of this motion detection method, the optical sensing device comprises an optical lens to focus the radiation reflected from the illuminated surface portion on the photodetector device and the method comprises a preliminary step consisting in adjusting the position of the coherent light source and/or moving the optical lens for obtaining an optical gradient.

According to a third variant of this motion detection method, it comprises a step for defining an intensity threshold under which the extracting means do not extract any motion features. This intensity threshold is advantageously adjustable. Alternatively, The method comprises sub-steps consisting in defining at least two intensity thresholds under which the extracting means do not extract any motion features; and selecting one of the at least two intensity thresholds.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed method may be adapted to extract motion features by comparing light intensity variations of pixels over time.

What is claimed is:

1. A method for measuring relative motion between an illuminated portion of a surface and an optical sensing device comprising a coherent light source and a photodetector device, this photodetector device including an array of pixels associated with comparators for comparing light intensity between neighbouring pixels, said method comprising the steps of:

illuminating by means of said coherent light source said surface portion at a determined flash rate;

detecting by means of said photodetector device a speckled light intensity pattern, defining first and second axes, of said illuminated portion of the surface for each flash and determining in this pattern along said first and second axes positive and negative edges;

extracting Peaks and Nulls for each of said detected speckled light intensity patterns by respectively defining successions of a positive edge and a negative edge and successions of a negative edge and a positive edge;

determining a measurement of the relative motion between said optical sensing device and said illuminated portion of the surface based on a comparison of extracted Peaks and Nulls of successive detected speckled light intensity patterns;

wherein, before the step of determining a measurement of the relative motion, said method further comprises the step of:

keeping only pairs of neighbouring Peaks and Nulls and ignoring individually occurring Peaks and Nulls.

2. The method according to claim 1, wherein it further comprises a preliminary step of modifying or adjusting a light intensity gradient under which said surface portion is illuminated.

3. The method according to claim 2, wherein said optical sensing device comprises an optical lens to focus radiation reflected from said illuminated surface portion on said photodetector device and wherein said method comprises a preliminary step of adjusting the position of said coherent light source and/or moving said optical lens for modifying or adjusting said light intensity gradient.

4. The method according to claim 1, wherein it further comprises the step of introducing an offset at one input of said comparators.

5. The method according to claim 1, wherein it further comprises the step of introducing an adjustable offset at one input of said comparators.

6. The method according to claim 1, wherein it further comprises a step of defining an intensity threshold under which said Peaks and Nulls are not extracted.

7. The method according to claim 6, wherein said intensity threshold is adjustable.

8. The method according to claim 1, wherein it further comprises the steps of:
   defining at least two intensity thresholds under which said Peaks and Nulls are not extracted; and
   selecting one of said at least two intensity thresholds for enhancing tracking performance.

9. An optical motion sensing device comprising:
   a coherent light source for illuminating a surface portion with radiation at a determined flash rate;
   a photodetector device responsive to radiation reflected from the illuminated surface portion and determining a speckled light intensity pattern of said illuminated surface portion for each flash, said intensity pattern defining first and second axes, and associated means for determining in this pattern along said first and second axes positive and negative edges;
   means for extracting Peaks and Nulls for each of said speckled light intensity patterns by respectively defining successions of a positive edge and a negative edge and successions of a negative edge and a positive edge; and
   processing means for determining, based on said extracted Peaks and Nulls of successive detected speckled light intensity patterns, a measurement of relative motion between said optical motion sensing device and said illuminated portion of the surface;
   wherein said processing means further comprises selecting means for keeping only pairs of neighbouring Peaks and Nulls and ignoring individually occurring Peaks and Nulls.

10. The optical motion sensing device according to claim 9, wherein it comprises filtering means which modifies or adjusts a light intensity gradient of said radiation impinging on said surface portion.

11. The optical motion sensing device according to claim 10, wherein said photodetector device comprise an array of pixels and said means for extracting Peaks and Nulls comprises comparators for comparing light intensity between neighbouring pixels in order to determine said positive and negative edges, and wherein said optical motion sensing device comprises further filtering means formed by an offset at one input of said comparators.

12. The optical motion sensing device according to claim 11, wherein said offset is an adjustable offset.

13. The optical motion sensing device according to claim 12, wherein it further comprises a feedback loop acting on said adjustable offset for adjusting the density of Peaks and Nulls.

14. The optical motion sensing device according to claim 10, wherein said optical motion sensing device comprises an optical lens to focus said radiation reflected from said illuminated surface portion on said photodetector device and wherein said light intensity gradient is modified or adjusted by adjusting the position of said coherent light source and/or moving said optical lens.

15. The optical motion sensing device according to claim 10, wherein it comprises further filtering means defining an intensity threshold under which said extracting means do not extract any Peaks and Nulls.

16. The optical motion sensing device according to claim 15, wherein said intensity threshold is adjustable.

17. The optical motion sensing device according to claim 10, wherein said filtering means defines at least two intensity thresholds under which said extracting means do not extract any Peaks and Nulls and wherein said sensing device further comprises selecting means for selecting one of said at least two intensity thresholds for enhancing tracking performances.

* * * * *